3,017,424
PROCESS FOR THE PRODUCTION OF DIARYLCARBONATES

Karl-Heinrich Meyer, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Filed Mar. 25, 1958, Ser. No. 723,648
Claims priority, application Germany, April 8, 1957
6 Claims. (Cl. 260—463)

This invention is concerned with a process for the production of diaryl-carbonates.

It is known to produce diaryl-carbonates by the reaction of phenols with phosgene in aqueous solution, hydrogen chloride being split off: this is removed during the reaction by the addition of acid-binding agents, such as tertiary organic amines or aqueous inorganic bases. In some cases, inert organic solvents which are not miscible with water, such as benzene, toleune and xylene, are added.

In this process chlorocarbonic acid esters of the phenols are formed as intermediates which react with further quantities of phenol to form the diaryl-carbonates. Correspondingly, such chlorocarbonic acid esters themselves can also be reacted with phenols under the same conditions to give diaryl-carbonates.

The diaryl-carbonates so obtained are normally purified, after the removal of the hydrogen chloride formed or of the salts formed, as well as of the excess phenol and any solvents which may possibly be present, by distillation.

In the described process, the reaction with phosgene proceeds comparatively slowly. For the quantitative reaction of the chlorocarbonic acid esters of the phenols which are formed as intermediates, lengthy reaction times at elevated temperatures are necessary.

According to the invention, the reaction of phenates with phosgene in aqueous solution in the presence of organic solvents which are not miscible with water to give diaryl-carbonates is considerably accelerated by using a highly dispersed system in which the aqueous phenate solution forms one phase and the solution of phosgene in the organic solvent forms the other phase.

In this way, it is especially surprising that the saponification of the phosgene dissolved in the organic solvent which proceeds as a side reaction, not only does not increase by stirring with the basic aqueous solution but can even be repressed in comparison with the known working method in a poorly dispersed system.

The highly dispersed systems can be obtained by, for example, vigorous stirring of a mixture of an aqueous phenate solution with, for example, aromatic hydrocarbons. By the addition of small amounts of surface-active materials they can also be produced with normal stirring speeds. Some organic solvents, such as aliphatic chlorinated hydrocarbons, make, on the other hand, special procedure unnecessary, since with their use, even with normal stirring speeds, good emulsions can be produced without the addition of surface-active materials.

For the acceleration of the reaction, additional tertiary amines can be added.

All unsubstituted and substituted aromatic monohydroxy compounds are suitable so far as the substituents which eventually are present, do not disturb the reaction with phosgene. As examples of suitable phenols there may be mentioned phenol, the chlorinated phenols such as the mono-, the di-, the tri-, the tetra- and the pentachlorophenols, the corresponding nitrophenols, the cresols, the ethyl-, propyl-, isopropyl-, n-butyl-, isobutyl- and amylphenols, the xylenols and the naphthols.

Thus there may be prepared in accordance with the present invention, the following carbonates:
Diphenyl carbonate, from phenol,
Di-o-cresyl carbonate, from o-cresol,
Di-m-cresyl carbonate, from m-cresol,
Di-p-cresyl carbonate, from p-cresol,
Phenyl cresyl carbonates, from mixtures of phenols and the respective cresols,
o-Cresyl p-cresyl carbonate, from a mixture of o- and p-cresols,
m-Cresyl p-cresyl carbonate, from a mixture of m- and p-cresols,
o-Cresyl m-cresyl carbonate, from a mixture of o- and m-cresols,
Di-beta-naphthyl carbonate, from beta-naphthol,
Di-beta-naphthyl carbonte, from beta-naphthol,
Phenyl naphthyl and cresyl naphthyl carbonates, from the corresponding phenol or cresol naphthol mixtures.

The phenols are, as already mentioned, used in the form of aqueous phenate solutions which are preferably prepared by dissolving the phenol in an alkali metal or alkaline earth metal hydroxide.

Solvents which are not soluble in water and which may suitably be used are, for example, aromatic hydrocarbons, such as benzene, toluene, xylene, chlorinated aromatic and aliphatic hydrocarbons, such as chlorobenzene, dichlorobenzene, chloronaphthalene, methylenechloride, ethylenechloride, chlorfrom, carbon tetrachloride and tetrachloroethane. Of these, the use of the aliphatic chlorinated hydrocarbons are especially advantageous since these materials, as mentioned, easily emulsify in the aqueous phase by light stirring and, furthermore, the diaryl-carbonates formed are usually easily soluble in them so that the reaction products can be easily isolated.

As surface-active materials all ionic and non-ionic emulsifiers are suitable which are active in alkaline media, for example, polyglycol ethers, sodium dibutylnaphthalene sulphonate and sodium isopropylnaphthalene sulphonate.

The process according to the invention can be so carried out that a solution of phosgene in a solvent or in a mixture of different solvents of the mentioned type is emulsified with the aqueous phenate solution. If desired, a solvent can be previouly emulsified with the aqueous phase.

Equally good results are also obtained when the organic solvent or a mixture of such solvents is emulsified with the phenate solution and gaseous phosgene then passed into the emulsion.

The reaction proceeds with sufficient speed even at temperatures below room temperature. At room temperature the reaction is finished in a few minutes.

The so-obtained dispersion of the aqueous salt solution and the solution of the diaryl-carbonates formed in the inert solvent easily separates after the termination of the reaction into an organic and an aqueous layer. The pure diaryl-carbonate can be obtained by distillation from the organic layer after washing with water and distilling off the solvent and any phenol which may be present.

As a result of the short reaction time, the new process is especially suitable for a continuous working process.

The reaction products are well known per se in the art. They may be used in the same manner, as the known diaryl-carbonates, for instance as intermediate for the production of polycarbonates by interesterifying with di-(monohydroxy arylene)-alkanes in the melt.

The following examples are given to illustrate the invention:

EXAMPLE 1

In six comparative experiments, solutions of phosgene in different organic solvents and under different conditions were placed in a water-cooled-container provided wtih a stirrer and reacted wtih aqueous phenate solutions (reaction temperature 30° C.) until all the chloroformic acid ester formed as an intermediate had reacted. The following tables show the results.

The first experiment corresponds to the known method (poorly dispersed system) whereas experiments 2–6 illustrate the substantially shortened reaction time which is achieved by carrying out the reaction in the highly dispersed system according to the invention.

EXAMPLE 2

In a water-cooled container provided with a stirrer and with an overflow, 55 grams/minute of phosgene and 70 grams/minute of a 2 percent triethylamine solution in methylene chloride were mixed together wtih an aqueous sodium phenate solution (23.55 percent phenol and 16.7 percent sodium hydroxide). In this way, 7.5 grams phosgene were taken up per minute. For the subsequent reaction the mixture was led through two further water-cooled overflow vessels. The total reaction time was 14.5 minutes. The mixture was subsequently passed into a glass vessel where it separated into two fluid phases: the lower phase consisted of a solution of diphenyl carbonate in methylene chloride. It was separated off and continuously washed with water. The solvent was now distilled off in a pass-through evaporator. The diphenyl carbonate, which precipitated out as a sludge, had a melting point 78–79° C. and was subsequently purified by vacuum distillation. Boiling point 160° C. 9 mm., melting point 79° C. The yield amounted to 13.1 grams/minute, i.e. 89 percent theoretical calculated on the phenol introduced and 100 percent theoretical calculated on the reacted phenol.

Table I

| Expt. No. | Sodium phenate solution | | | Phosgene solution | | | |
|---|---|---|---|---|---|---|---|
| | Phenol, gm. | NaOH, gm. | Water, gm. | Triethyl-amine, gm. | Solvent | | Phosgene, gm. |
| 1 | 53.8 phenol | 42.6 | 175 | 0.5 | 430 gm. toluene | | 40 |
| 2 | do | 42.6 | 175 | 0.5 | do | | 40 |
| 3 | do | 43.1 | 270 | 0.5 | 360 gm. toluene+1% emulsifier.[1] | | 43.3 |
| 4 | do | 32.6 | 150 | 0.5 | 290 gm. methylene chloride | | 35.6 |
| 5 | 62 o-cresol | 42.4 | 300 | 0.5 | 400 gm. methylene chloride | | 40 |
| 6 | 81.8 β-naphthol | 42.6 | 300 | 0.5 | do | | 35.4 |

[1] The emulsifier is sodium diisobutyl naphthalene sulphonate.

Table II

| Expt. No. | Stirring Speed | Degree of dispersion | Time of reaction in minutes | Yield of diaryl carbonate, gms. | Saponified phosgene, percent |
|---|---|---|---|---|---|
| 1 | normal (leaf stirrer) | poor dispersion | 105 | 61.2 | 29 |
| 2 | very fast (ultra-turrax) | highly dispersed | 20 | 61.2 | 29 |
| 3 | normal (leaf stirrer) | do | 9 | 61.2 | 34.4 |
| 4 | do | do | 10 | 61.2 | 20 |
| 5 | do | do | 10 | 69.4 | 29.8 |
| 6 | do | do | 10 | 89.2 | 20.6 |

We claim:

1. In a process for the production of diarylcarbonates by reacting phosgene with an aqueous solution of a compound selected from the group consisting of the alkali metal and alkaline earth metal phenoxides and naphthoxides, the improvement of carrying out the reaction in a highly dispersed two-phase system in which the aqueous solution forms one phase and a solution of phosgene in a chlorinated aliphatic hydrocarbon selected from the group consisting of methylene chloride, ethylene chloride, chloroform, carbon tetrachloride and tetrachloroethane, forms the second phase.

2. In a process for the production of diphenylcarbonates by the reaction of sodium phenate with phosgene, the improvement of accelerating said reaction by stirring at room temperature an aqueous solution of sodium phenate with a solution of phosgene in ethylene chloride and a small amount of triethylamine so as to obtain a highly dispersed two-phase system.

3. Process according to claim 1 wherein said liquid chlorinated aliphatic hydrocarbon is methylene chloride.

4. Process according to claim 1 wherein the reaction is carried out at a temperature not in excess of 30° C.

5. Process according to claim 1 wherein the reaction is accelerated by the addition of a tertiary amine.

6. Process according to claim 5 wherein the tertiary amine is triethylamine.

References Cited in the file of this patent
UNITED STATES PATENTS

| | | |
|---|---|---|
| 2,260,547 | Valik | Oct. 28, 1941 |
| 2,262,002 | Hopff et al. | Nov. 11, 1941 |
| 2,335,441 | Pearson et al. | Nov. 30, 1943 |
| 2,370,469 | Muskat et al. | Feb. 27, 1945 |

OTHER REFERENCES

Hattinger: Chemical Industries, July 1937, vol. 41, No. 1, pages 63–64.